July 21, 1931.    A. F. STAMM    1,815,808
VIBRATION DAMPER
Filed Jan. 16, 1930
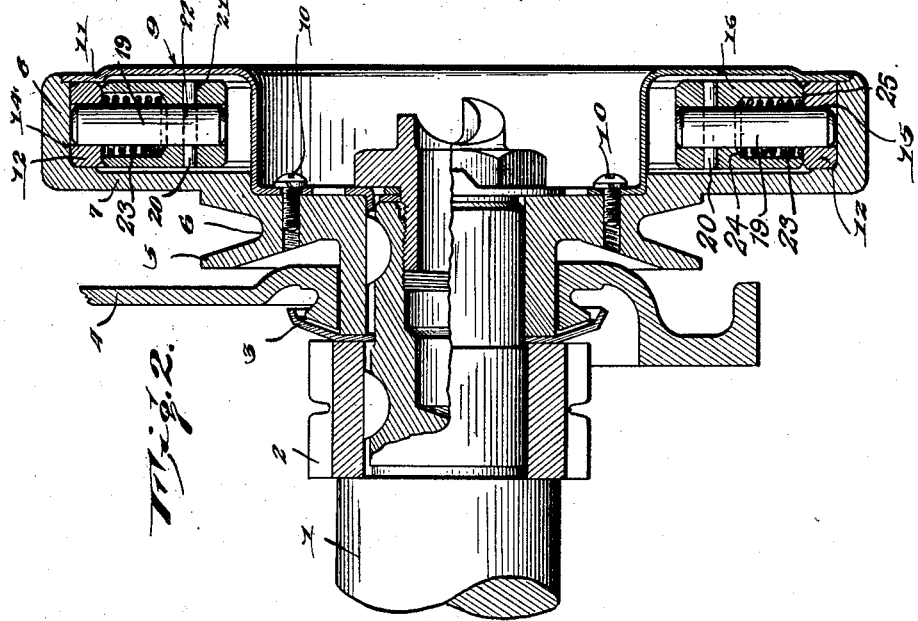
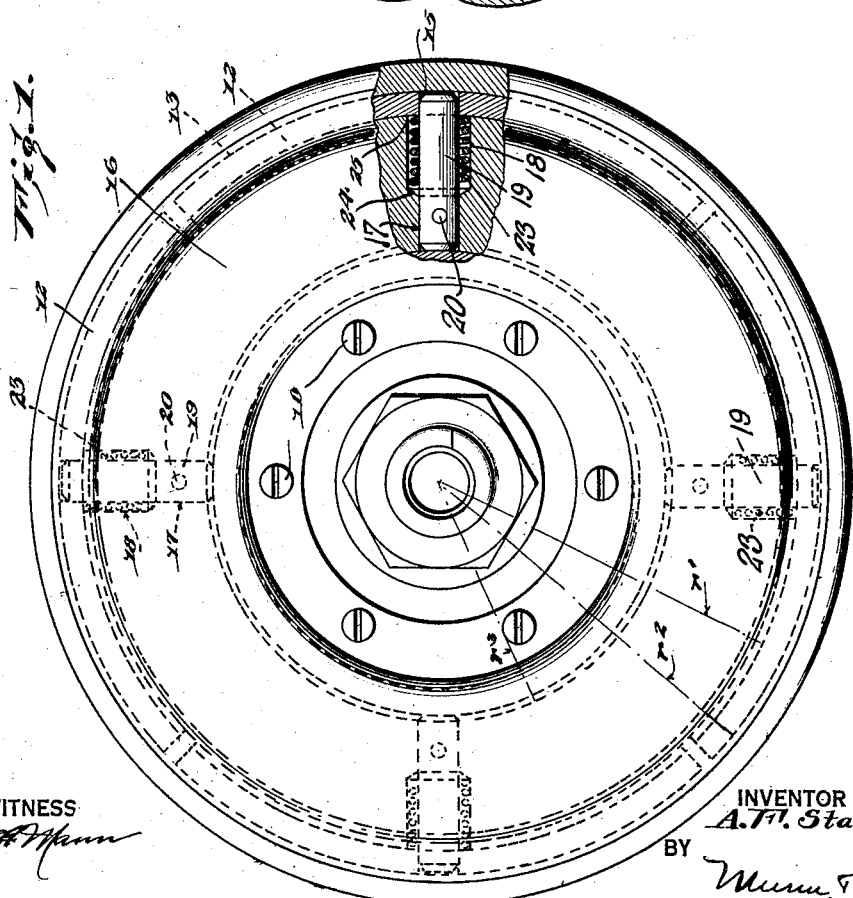
WITNESS
INVENTOR
A. F. Stamm,
BY
ATTORNEY

Patented July 21, 1931

1,815,808

UNITED STATES PATENT OFFICE

ALEXANDER F. STAMM, OF DETROIT, MICHIGAN

VIBRATION DAMPER

Application filed January 16, 1930. Serial No. 421,229.

This invention relates to torsional vibration dampers for use on shafts of any nature subjected to torsional vibration, and more particularly for use on automobile, airplane, and similar engine shafts, and it consists in the constructions, arrangements and combinations herein set forth and claimed.

The invention is designed as an improvement over the device disclosed in application for Letters Patent on vibration damper, Serial No. 408,900, filed November 21, 1929, by Alexander Stamm and Friedrich K. Knohl.

An object of my invention is to provide a torsional vibration damper which will assure the operation of the damping action at all times and will consequently dampen the torsional vibrations throughout the entire speed range of the shaft to which it is applied when proportioned to dampen the vibrations at any instant speed within said range. As set forth in the above noted application, adjustable damping is accomplished by freely mounting friction shoes on the rotatable shaft, engageable with frictional surfaces integral with said shaft, so that the freely mounted shoes, due to their inertia, rotate at a constant speed, while the cooperating frictional surfaces integral with the shaft rotate at variable speeds due to the torsional vibrations, and this relative movement dampens out the vibrations in accordance with the force of said vibrations because of the exertion on the shoes and the masses setting up the torsional vibrations of centrifugal forces during the rotation. These frictional shoes, being subjected to centrifugal force with consequent variation in the friction existent between the shoes and their cooperating surfaces according to the square of the velocity of rotation of said shaft and the torsional vibrations set up in said shaft being caused by the unequal forces exerted therealong, which are also greatly the result of centrifugal forces, and vary according to the square of the velocity of rotation, thereby provide an arrangement wherein the damping effect is always equal to the vibratory forces causing the torsional vibration. It is therefore obvious that when the damper is properly proportioned to dampen the torsional vibrations at a given speed of said shaft, it will dampen the torsional vibrations throughout the entire speed range because of the constant ratio between the damping effect and the torsional vibration forces.

In the use of the device set forth in this prior patent application, it was found that if the friction sectors or shoes were made large enough to have the necessary polar moment of inertia to store up sufficient energy to completely dampen torsional vibration, the frictional resisting moment might be so great that slipping between said shoes and their cooperating flange might not occur, and, therefore, would bring about no damping action.

In attempting to overcome this difficulty, I have found that if the friction sectors or shoes are coupled to an annular ring, the kinetic energy of said annular ring will be sufficient to overcome the frictional adhesion of the sectors or shoes to their cooperating flange and to bring about slippage therebetween with consequent dissipation of the torsional vibratory forces between said engaging frictional surfaces in the form of heat. It is therefore a primary object of my invention to provide a construction that will assure slippage between the friction shoes as well as variation in the frictional force according to the force of the torsional vibrations.

A further object of my invention is to provide a torsional vibration damper which has few parts, is simple to manufacture, and does not get out of order easily.

Further objects and advantages will appear as the specification proceeds and the invention will be more particularly defined in the appended claims.

An embodiment of my invention is shown in the accompanying drawings forming part of this application, in which:

Figure 1 is a front elevational view of a device according to my invention; and

Figure 2 is a vertical sectional view of the device shown in Figure 1.

In carrying out my invention, I make use of any shaft 1, for example, the crank shaft of an automobile or airplane engine, which is subjected to torsional vibration.

In the embodiment shown, the shaft 1 has a gear 2 mounted thereon, an oil slinger 3 positioned in front of said gear and an oil guard 4 positioned adjacent said oil slinger. These elements constitute no part of my invention.

At 5 I have shown an automobile fan belt pulley which, in this preferred embodiment, has been modified according to my invention. This fan belt pulley has a groove 6 for the reception of a fan belt, as is easily understood.

In adapting this pulley to my construction, I provide the same with the radially extending flanged wall 7, having the axially extending peripheral flange portion 8. A disk flange member 9 may be secured to the pulley member 5 by means of the bolts 10, or any other suitable means. This disk flange 9 provides an annular wall 11 engaging with the peripheral wall 8, and positioned in spaced relation to the wall 7, defining in cooperation with the wall 7 and the peripheral wall 8, a track which is adapted to frictionally engage the friction sectors or shoe members 12 which ride therein.

These friction sectors or shoes 12 form an annular frictional member which may be composed of any desired number of friction sectors or shoes rather than the four such shoes shown in this embodiment.

These shoes present frictional surfaces 13 on their outer peripheries for engagement with the frictional surfaces 14 on the inner periphery of the peripheral wall 8. It is between these surfaces that the torsional vibrations are dampened and dissipated in the form of heat. Each of these sectors is provided with a radial bore 15, which cooperates with other members for an operation soon to be described.

For assuring slippage between the frictional surfaces 13 and 14 on the members 12 and 8, the annular ring member 16, which I term the kinetic energy ring, is provided. This ring is an unbroken annulus surrounding the shaft and positioned within the circle formed by the friction sectors or shoes, and is provided with radial bores 17 which aline with the bores 15 for the reception of coupling means between said members. Counter bores 18 are provided in communication with the bores 17 for a purpose that will soon appear.

For coupling the members 16 and 12 in relative fixed position, the coupling pins 19 are provided. As appears in the drawings, these coupling pins 19 engage through the bores 17 and 15, and are secured therein against longitudinal movement by the transverse pin members 20. These transverse pin members 20, engage through axial bores 21 in the annular ring 16 and through bores 22 in the pin members 19.

To maintain the friction sectors or shoes 12 in frictional engagement with the surface 14 of the peripheral wall 8 when the shaft is at rest, and to prevent shocks incident to the engagement of the walls 13 and 14 during the rapid acceleration of the velocity of rotation of the shaft, the spring members 23 are supplied. These spring members 23 seat in the counter-bores 18 to engage at one of their ends the shoulders 24 formed at the base of the counter-bore 18 and the inner peripheral surfaces 25 of the friction sectors or shoes 12. This spring is of the type commonly known as a compression spring, and normally urges the friction shoes or sectors 12 outwardly from the annular ring 16 and into engagement with the friction surface 14 on the peripheral wall 8.

In proportioning the parts and setting them up for use, the friction sectors or shoes 12 are so proportioned that when operatively connected with the annular ring 16 and set into rotation therewith, they will exert just sufficient force on the friction surface 14 to dampen out the torsional vibrations transmitted through said surface without exerting a great enough force on said surface to prevent slippage between said shoes and said surface. It is obvious that this force existent between the friction surfaces 13 and 14 will vary according to the speed of rotation of the shaft, and consequent centrifugal forces acting upon said members. It is also obvious that the torsional vibrations transmitted through the surface 14 when the device is used on shafts wherein the torsional vibrations vary according to centrifugal force, will vary directly as the damping effect exerted by the friction sectors or shoes.

For example, in the application of my invention to a shaft in which the required frictional resisting moment is 918.75 inch lbs. at 4100 R. P. M., the proportions of the apparatus could be arrived at as follows:

The coefficient of friction between the friction shoe 12 and the damper shell 8 is taken to be .15—a fair value for cast iron on cast iron, with smooth unlubricated surfaces.

Since,
$$M = CFR$$
When $M$ = frictional resisting moment
$C$ = co-efficient of friction
$F$ = centrifugal force,
$R$ = outside radius
$$F = \frac{M}{CR} = \frac{918.75}{.15 \times 4.5} = 1361 \text{ lbs.}$$

The radius of gyration of the friction shoe is,
$$r = \sqrt{\frac{r_1^2 + r_2^2}{2}}$$
$$= \sqrt{\frac{4.125^2 + 4.5^2}{2}} = 4.32 \text{ in.}$$

Where $r_1$ is equal to the radius of the inner periphery of the friction shoe and $r_2$ is the radius of the outer periphery of said shoe.

For determining the weight of each friction shoe we use the expression for the centrifugal force:

$$F = \frac{WV^2}{32.2\, r}$$

$$W = \frac{F(32.2\, r)}{V^2}$$

$$W = \frac{1361 \times 32.2 \times 4.32}{12(4100/60 \times 2\pi 4.32/12)^2}$$

$$W = .662$$

The weight of each friction shoe must be .662 lb.

The maximum possible weight of all shoes is, $$W = \pi \times .256 \times 1(4.5^2 - 4.125^2) = 2.596 \text{ lb.}$$

The arc of the sector is, $$\frac{.662}{2.596} = \frac{D}{360}$$
$$D = 92 \text{ deg.}$$

It is decided to use four sectors with ⅛ in. space between the ends so that the resulting arc will be about 88 degrees.

In order to permit this, the spring pressure should be about $$\frac{92-88}{92} \times 1361 = 57 \text{ lbs.}$$

The polar moment of inertia of the sectors is:

$$\frac{4 \times 88}{360} \times \frac{2.596}{3.22} \times 4.32^2 = 1.47$$

The total moment of inertia of the damper ring and sectors must be 4.47.

The moment of inertia of the ring must be $$4.47 - 1.47 = 3$$

$$I = \frac{\pi m a (r_1^4 - r_3^4)}{2}$$

Where $r_3$ is the radius of the inner periphery of the annular ring 16

$$3.0 = \frac{3.14 \times .00794 \times 1(4.125^4 - r_3^4)}{2}$$

$$6 = .025(289.5 - r_3^4)$$

$$r_3^4 = 49.6.$$

$$r_3 = 2.655$$

The inside radius of the ring is 2⅝ inches, approximately.

The use and operation of the device is clearly understood from the foregoing description. The fan belt pulley is modified as previously set forth, to accommodate the friction sectors 12 and the annular ring member 16. When the shaft rotates, the annular ring 16 and coupled friction sectors or shoes 12 will, due to their inertia, and their free mounting, rotate at a substantially constant speed while the peripheral wall 8 and engaging friction surface 14, will respond to the torsional vibrations in the shaft and rotate at a constantly varying speed. The torsional vibrations causing the variation in said speed will be frictionally braked and dampened out by means of the engagement of said surface with the friction sectors or shoes 12. The frictional force exerted during this operation will vary as heretofore set forth in accordance with the torsional vibratory forces transmitted through the peripheral member 8 and the frictional surface 14.

The springs 23 will serve to maintain the shoes in engagement when the shaft is at rest or when subjected to unusually high accelerational forces.

The disk flange 9 is well adapted to exclude dirt, oil, and other foreign matter from the working parts of the device.

I claim:

1. In a damper for use on shafts subjected to torsional vibrations, an annular frictional surface rotatable with said shaft and adapted to transmit torsional vibrations from said shaft, friction shoes engageable with said frictional surface, an annular ring for mounting said friction shoes, and means for coupling said shoes to said annular ring comprising radially extending pins engaging said shoes and said ring.

2. In a damper for use on shafts subjected to torsional vibrations, an annular frictional surface rotatable with said shaft and adapted to transmit torsional vibrations from said shaft, friction shoes engageable with said frictional surface, an annular ring for mounting said friction shoes, and means for coupling said shoes to said annular ring, comprising radially extending pins engaging said shoes and said ring and compression springs mounted on said pins and interposed between said ring and shoes.

3. In a damper for use on shafts subjected to torsional vibrations, an annular frictional surface rotatable with said shaft and adapted to transmit torsional vibrations from said shaft, friction shoes engageable with said frictional surface, each of said shoes having a radial bore, an annular ring for mounting said friction shoes, radially extending pins rigid on said annular ring for engagement in the respective radial bores of said shoes, and resilient means disposed around said pins and between said ring and shoes.

ALEXANDER F. STAMM.